US008670293B2

(12) United States Patent
Morozov

(10) Patent No.: US 8,670,293 B2
(45) Date of Patent: Mar. 11, 2014

(54) BROADBAND SOUND SOURCE FOR LONG DISTANCE UNDERWATER SOUND PROPAGATION

(75) Inventor: Andrey K. Morozov, Falmouth, MA (US)

(73) Assignee: Woods Hole Oceanographic Institution, Woods Hole, MA (US)

( * ) Notice: Subject to any disclaimer, the term of this patent is extended or adjusted under 35 U.S.C. 154(b) by 162 days.

(21) Appl. No.: 13/430,250

(22) Filed: Mar. 26, 2012

(65) Prior Publication Data

US 2012/0269037 A1 Oct. 25, 2012

Related U.S. Application Data

(60) Provisional application No. 61/467,671, filed on Mar. 25, 2011.

(51) Int. Cl.
*G10K 11/00* (2006.01)
*H04B 13/02* (2006.01)

(52) U.S. Cl.
USPC .......................................... 367/176

(58) Field of Classification Search
USPC ................... 367/131, 142, 141, 176
See application file for complete search history.

(56) References Cited

U.S. PATENT DOCUMENTS

| 2,880,404 | A  | * | 3/1959  | Harris ......................... 367/157 |
| 6,814,180 | B1 | * | 11/2004 | Rossby et al. ................ 367/141 |
| 2012/0269037 | A1 | * | 10/2012 | Morozov ..................... 367/131 |

OTHER PUBLICATIONS

Howarth et al., "Development of a Broadband Underwater Sound Projector"; pp. 1195-1200; Oct. 1997.*

* cited by examiner

*Primary Examiner* — Daniel Pihulic
(74) *Attorney, Agent, or Firm* — Ropes & Gray LLP

(57) ABSTRACT

The systems described include a light-weight, low frequency (200 Hz-1000 Hz), broadband underwater sound sources that comprise an inner resonator tube with thin walls tuned to a certain frequency surrounded by a shorter, larger-diameter, lower frequency tuned outer resonator tube that has an acoustic source suspended off-center inside the inner resonator tube.

16 Claims, 5 Drawing Sheets

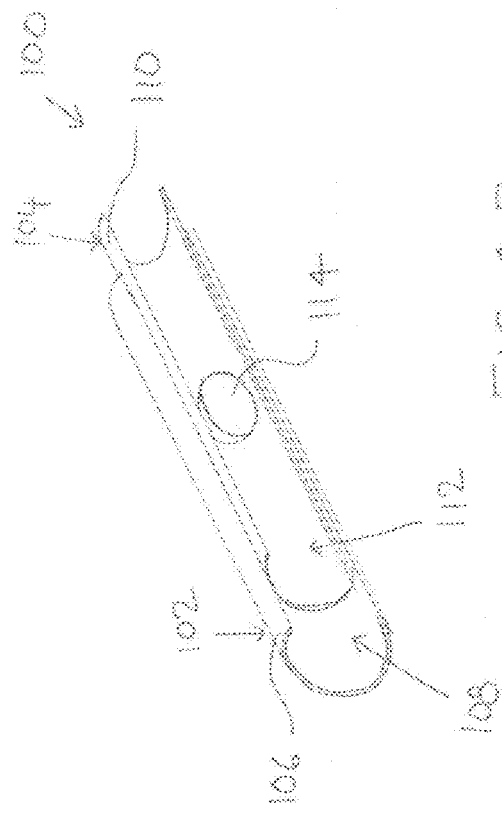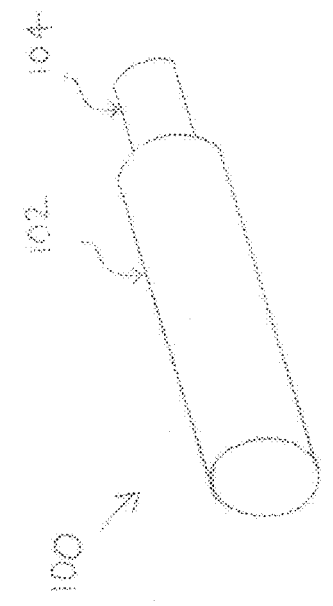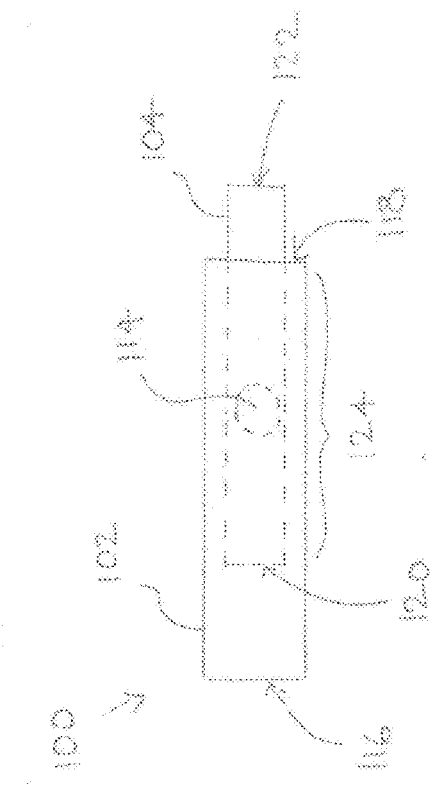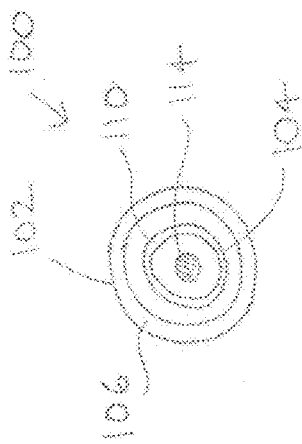

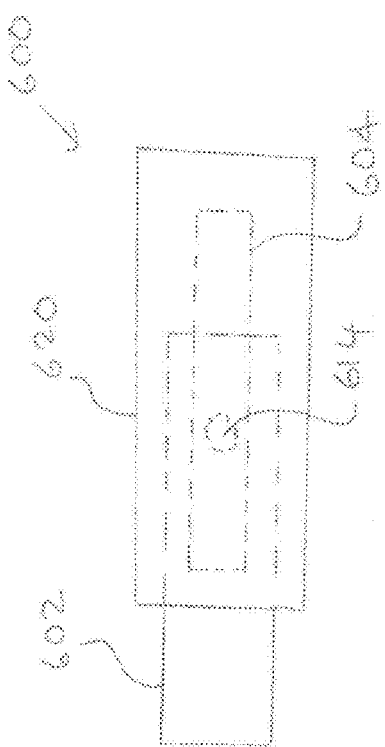
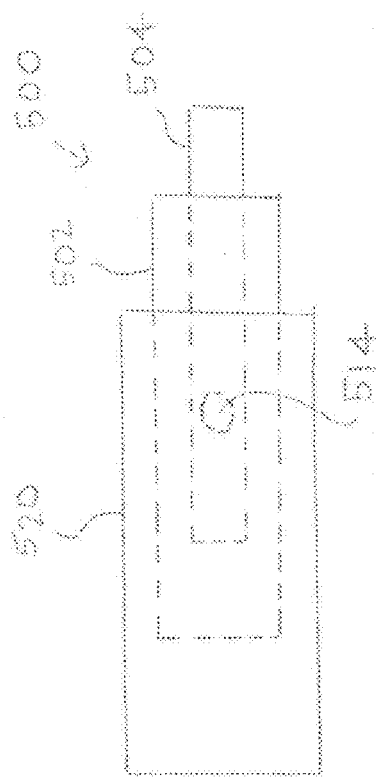

BROADBAND SOUND SOURCE FOR LONG DISTANCE UNDERWATER SOUND PROPAGATION

CROSS-REFERENCE TO RELATED APPLICATIONS

This application claims the benefit of U.S. Provisional Patent Application No. 61/467,671, filed on Mar. 25, 2011, the entire disclosure of which is hereby incorporated by reference as if set forth herein in its entirety.

BACKGROUND

Underwater sound projectors have a number of uses including communication, object detection, and geographic mapping.

For example, underwater sound sources may be used to track buoys that are free floating through the ocean. Underwater sound sources may be placed 1,000 meters or more below the ocean surface and placed into the deep sound channel or SOFAR channel that provides for extremely long distance sound propagation within the ocean. The data collected from the buoys illustrates current flow across large stretches of ocean. An example of an underwater sound source is described in U.S. Pat. No. 6,814,180. The sound source described in this issued U.S. Patent uses a tubular housing with a monopole driver positioned within the housing. Sea water floods the housing and the driver causes the tubular housing to vibrate. This provides a narrow-band underwater sound source that resonates at a frequency dependent upon the geometric characteristics of the tubular housing.

Broadband underwater sound projectors have also been developed. These broadband sources can transmit in wide range, such as in the range of 10 kHz to 100 kHz. One such broadband underwater sound projector was described by Howarth and Ting in the government publication "*Development of a Broadband Underwater Sound Projector*," www.matsysinc.com/products/sonar_transducers/docs/dev_broadband_underwater_sound_projector.pdf. That underwater broadband sound projector includes an enclosed conical diaphragm that vibrates for the purpose of generating a broadband acoustic sound. These systems can work well, but tend to have a fixed frequency range.

There remains a need for improved broadband underwater sound sources.

SUMMARY

The systems and methods described herein include, among other things, light-weight double resonant, broadband underwater sound sources, having coaxial shifted pipes.

The devices described herein are light-weight, low frequency (200 Hz-1000 Hz), broadband (about decade frequency range) underwater sound projectors that comprise an inner resonator tube with thin walls tuned to a certain frequency surrounded by a shorter, larger-diameter, lower frequency tuned resonator that has a monopole acoustic source suspended off-center inside the inner resonator. These resonating tubes are opened on both ends and typically made of carbon fiber. The inner tube typically has much thinner walls vibrating under the sound pressure to allow the sound pressure spread into the outer tube. The tubes are asymmetrically shifted along the main axis and sound pressure can penetrate from internal pipe though the area under the shifted external pipe into that external pipe and back. By changing length of shifted area the coupling coefficient of two resonators can be regulated to achieve a necessary bandwidth. The pipe's resonance frequency is proportional to the pipe's length. The radiated power from the resonators is proportional to the area of the orifices and to square function of the propagated frequencies. To achieve a symmetrical frequency response the radiated power from both resonators should be approximately equal. The system can be expanded to the multi-resonance multi-frequency case with many coaxial pipes coupled through the shifted areas.

More particularly, in one aspect, the systems and methods described herein include an underwater sound source comprising a resonator assembly and an acoustic driver. The resonator assembly may include an outer resonator tube and an inner resonator tube. The outer resonator tube may have a first open end, a second open end, and a sidewall with a first thickness extending therebetween. The inner resonator tube may be at least partially disposed within the outer resonator tube, and may have a first open end, a second open end, a sidewall with a second thickness extending therebetween, such that the second thickness may be less than the first thickness. The inner resonator tube may be offset from the outer resonator tube along a longitudinal axis, such that the first end of the inner resonator tube is disposed within the outer resonator tube and the second end of the inner resonator tube is disposed outside of the outer resonator tube. In certain embodiments, the acoustic driver includes a spherical monopole.

The underwater sound source may be configured to resonate at a frequency within a range of about 200 Hz to about 1000 Hz. In certain embodiments, at least one of the inner resonator tube and the outer resonator tube is formed from carbon fiber. In certain embodiments, the inner resonator tube is formed from carbon fiber and the outer resonator tube may be formed from aluminum. The outer resonator tube and the inner resonator tube may be cylindrically shaped.

In certain embodiments, the first thickness is from about 5 mm to about 6 mm and the second thickness is from about 6 mm to about 7 mm. The length between the first end and the second end of the outer resonator tube along the longitudinal axis may be less than a length between the first end and the second end of the inner resonator tube along the longitudinal axis. The length of the inner resonator tube may be from about 450 mm to about 500 mm, and a length of the outer resonator tube may be from about 400 mm to about 450 mm.

The inner resonator tube may be adjustably fitted to the outer resonator tube such that outer resonator tube is moveable along the longitudinal axis with respect to the inner resonator tube, thereby allowing an adjustable resonant frequency range for the underwater sound source. The acoustic driver may be suspended within the inner resonator tube using one or more support structures coupling the acoustic driver to the wall of the inner resonator tube. The acoustic driver may be disposed at a position substantially equidistant from the first end of the inner resonator tube and the second end of the outer resonator tube. In certain embodiments, the resonator assembly may further comprise one or more additional outer resonator tubes, such that the acoustic driver, inner resonator tube and the outer resonator tube are at least partially disposed within the one or more additional outer resonator tubes.

In another aspect, the systems and methods described herein include methods for generating a broad band acoustic signal underwater. The methods include deploying a broad band sound source underwater, the sound source having a resonator assembly and an acoustic driver disposed within the resonator assembly. The resonator assembly may include an outer resonator tube having a first open end and a second open end, and an inner resonator tube, at least partially disposed within the outer resonator tube, having a first open end and a second open end. The inner resonator tube may be offset from the outer resonator tube along a longitudinal axis, such that the first open end of the inner resonator tube is disposed within the outer resonator tube and the second open end of the inner resonator tube is disposed outside of the outer resonator tube. The acoustic driver may be disposed within the inner resonator tube and the outer resonator tube. The method includes applying an electrical signal to the acoustic driver, thereby causing the acoustic driver to vibrate. In certain embodiments, the vibrating acoustic driver excites the fluid and causes the resonator assembly to vibrate and thereby resonate at frequencies across a range of 200 Hz to 1000 Hz. At least of the inner resonator tube and the outer resonator tube may be formed from carbon fiber. In certain embodiments, the inner resonator tube is adjustably fitted to the outer resonator tube, and the method may further comprise moving the outer resonator tube along the longitudinal axis with respect to the inner resonator tube, thereby adjusting a resonant frequency range for the sound source.

BRIEF DESCRIPTION OF THE DRAWINGS

The foregoing and other objects and advantages of the present disclosure will be appreciated more fully from the following further description thereof, with reference to the accompanying drawings wherein;

FIG. 1A-1D depict different views of the structure of a broadband underwater sound source, according an illustrative embodiment;

FIGS. 6A and 6B depict side views of the structure of a broadband underwater sound source having a plurality of resonator tubes, according an illustrative embodiment.

DESCRIPTION OF THE ILLUSTRATED EMBODIMENTS

Figure 2A:
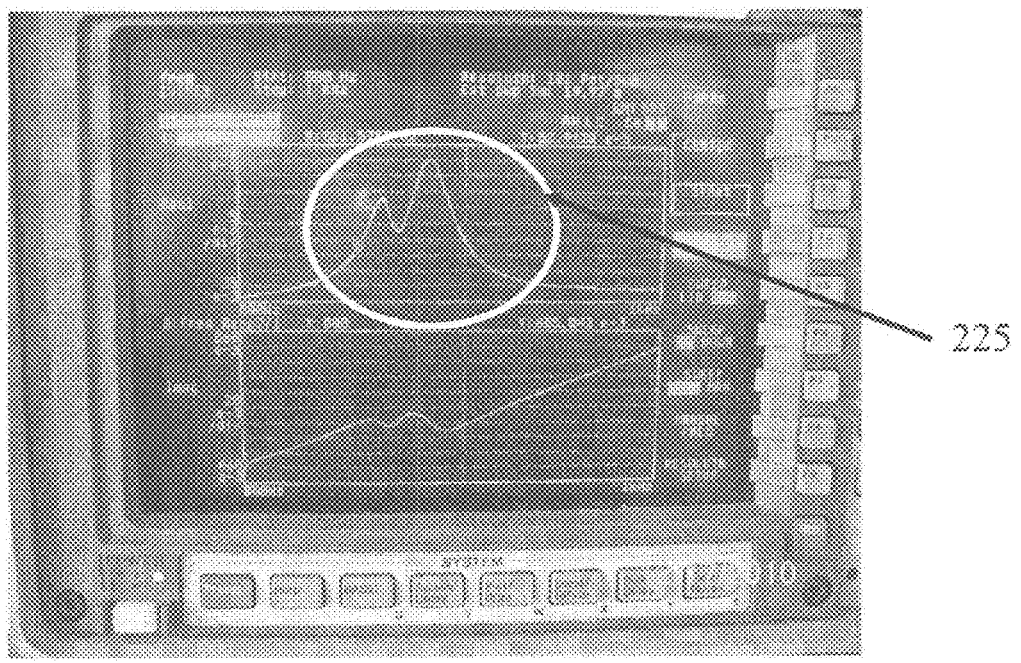
FIGS. 2A and 2B provides images of two sets of exemplary frequency disks generated for the broadband underwater sound source depicted in FIGS. 1A-1D, according an illustrative embodiment.

Generally, the broadband underwater sound source described herein includes at least two tubular resonator pipes, where one is fitted within the other. Disposed within the internal resonator pipe is a monopole acoustic source that is suspended off center within the internal pipe. In certain embodiments, the inner tube has a thin wall which might be made of aluminum or of carbon fiber, or of some other thin material. The point is that the thin walls should vibrate in response to sound pressure created by the monopole acoustic source. The wall vibrations of the inner tube create sound pressure in the area between the outer tube and the inner tube. The sound pressure in this overlapping region causes the outer tubular wall to also vibrate. As such, the overlapping length of the inner tube and the outer tube creates a coupling between the two tubes that will affect the overall frequency band of the underwater sound source. By changing the length of the overlap between the inner tube and the outer tube, one will change the coupling coefficient between these two resonators and therefore may change the bandwidth for the underwater sound source and thereby select the bandwidth desired for a particular application.

To provide an overall understanding of the present disclosure, certain illustrative embodiments will now be described. However, it will be understood by one of ordinary skill in the art that the systems and methods described herein can be adapted and modified for other suitable applications and that such other additions and modifications will not depart from the scope hereof.

FIGS. 1A-1D depict the internal structure of one example of a broadband underwater sound source 100. In particular, sound source 100 includes a resonator assembly having an inner resonator tube 104 and an outer resonator tube 102. The inner resonator tube 104 is at least partially disposed within the outer resonator tube 102 and, in certain embodiments, may be fitted within the outer resonator tube 102. Moreover, the inner resonator tube 104 is offset from the outer resonator tube 102 along a longitudinal axis. The sound source 100 includes an acoustic driver 114 disposed in the inner resonator tube 104 for generating pressure waves. When the sound source 100 is submerged in water, for example when the sound source 100 is deployed within the Sound Frequency and Ranging (SOFAR) channel or the Deep Sound Channel (DSC) of the ocean, the resonator assembly may be adapted to be flooded with fluid to form a fluid column within at least one of the inner resonator tube 104 and the outer resonator tube 102. During operation, acoustic driver 114 may generate a pressure wave thereby exciting the fluid column and allowing the sound source 100 to resonate.

In certain embodiments, the inner resonator tube 104 and/or outer resonator tube 102 is a hollow cylindrical tube having a circular cross section and an interior region 112. The resonator tubes 102 and 104 may have any suitable cross section including but not limited to triangular, rectangular and polygonal.

The outer resonator tube 102 may be formed from metals including aluminum, steel, or titanium. The outer resonator tube 104 may also be formed from metallic alloys and therefore include a plurality of metallic elements. The outer resonator tube 104 may be formed from polymers including polyvinyl chloride. In certain embodiments, the outer resonator tube 102 is formed from carbon fiber. Generally, the material for the outer resonator tube 104 may be selected as desired based on at least one of desired weight characteristics, desired thickness of the sidewalls 110 and desired acoustic resonance properties.

The inner resonator tube 104 may be formed from any suitable lightweight materials. For example, the inner resonator tube 104 may be formed from metals including aluminum, steel, or titanium. The inner resonator tube 104 may be formed from metallic alloys and therefore include a plurality of metallic elements. The outer resonator tube 104 may be formed from polymers including polyvinyl chloride. In certain embodiments, the inner resonator tube 104 is formed from carbon fiber. Generally, the material for the inner resonator tube 104 may be selected as desired based on at least one of desired weight characteristics, desired thickness of the sidewalls 110 and desired acoustic resonance properties. Advantageously for underwater applications, carbon fiber materials are generally lightweight, thin and provide desirable acoustic resonance at low frequencies. Generally, carbon fiber may have different acoustical properties in different directions. The acoustical properties of carbon fiber tubes may depend on the angle of fiber covering. In certain embodiments, it may be desirable to have a resonator tube with a main resonance mode and suppressed flexural parasite vibrations. In such embodiments, the resonator tube may include material that is stiff in the radial direction to support main resonance node and less stiff in axial direction to suppress any flexural parasite vibrations.

Not to be bound by theory, but selecting the thickness of the sidewalls of the inner resonator tube 104 to be less than, and in certain embodiments much less (for e.g., a factor of 5 or higher) than the thickness of the sidewalls of the outer resonator tube 102, allows sound pressure to spread from the interior of the inner resonator tube 104 to the outer resonator tube 102. In certain embodiments, the outer resonator tube 102 has a wall thickness from about 0.7 to 1.5 cm. The inner resonator tube 104 may have a wall thickness from about 0.1 to about 1 cm. However, the wall thickness of the resonators 102 and 104 may be selected to be any value and in any ratio as desired.

As shown in FIGS. 1B and 1C, the inner resonator tube 104 includes a first end 120 and a second end 122 and a sidewall 110 having a length, extending between these two ends. Similarly, outer resonator tube 102 includes a first end 116 and a second end 118 and a sidewall 106 having a length, extending between these two ends. The first ends 120 and 116 and the second ends 122 and 118 may be open to allow fluid to flow into the resonator assembly when submerged. The lengths of the inner resonator tube 104 and the outer resonator tube 102 may be selected as necessary to obtain desirable frequency characteristics. This is because, typically, the resonance frequency of the tubes 104 and 102 are directly proportional to the length of the tubes. In certain embodiments, the length of the inner resonator tube 104 and/or the outer resonator tube 102 is about 2 m.

Typically, the length of tubes 104 and 102 are proportional to about half of the wave-length of resonant frequencies of the sound source 100. The length of the resonator tube 104 may be different from the length of resonator tube 102. Depending on the lengths of tubes 104 and 102, and also the length of tube 104 relative to the length of tube 102, the frequency bandwidth may be increased or decreased.

In certain embodiments, the wavelength of sound generated by the acoustic driver 114 and traveling inside the tubes 104 and 102 may be about 30% shorter than when the sound travels in open water. This difference in wavelength inside the tubes 104 and 102 versus in open water may depend on the thickness of the tubes 104 and 102 or on the elasticity of the material of the tubes. In certain embodiments, such a difference of wavelength between inside and outside the tubes 104 and 102 is not ignored, but instead considered to expand the frequency bandwidth of the sound source 100. In such embodiments, the tubes 104 and 102 may be selected to have differing lengths. In other embodiments, such difference of wavelength between inside and outside the tubes 104 and 102 may be ignored. The lengths of the tubes 104 may vary from about 30 cm for a resonance frequency of about 2500 Hz to about 10 meters for a resonance frequency of about 75 Hz. In certain embodiments, it may be advantageous to have resonance frequencies of each of the tubes 104 and 102 to be substantially the same or at least close. In such embodiments, the difference in lengths between the inner tube 104 and the outer tube 102 may be 10% or less. When the difference between the lengths of the tubes 104 and 102 is small, the sound source 100 may benefit from a larger sound pressure level and improve efficiency. In certain embodiments, it may be advantageous to have resonance frequencies of each of the tubes 104 and 102 to be substantially different. In such embodiments, it may be desirable to achieve larger bandwidths.

In addition to the lengths of the inner resonator tube 104 and the outer resonator tube 102 influencing the frequency and corresponding frequency range of the sound source 100, the overlapping length of the offset inner resonator tube 104 and the outer resonator tube 102 assists in creating a coupling between the tubes that influences the frequency range of the sound source 100. Not to be bound by theory, but when the inner resonator tube 104 is asymmetrically shifted by an offset along the longitudinal axis, as shown in FIGS. 1A-1C, sound pressure can penetrate from the inner resonator tube 104 through the interior 108 of the outer resonator tube 102 into the outer resonator tube 102 and back. Generally, the radiated power from the resonators is proportional to the area of the openings at the first ends 116 and 120 and the second ends 118 and 122. The radiated power may also be proportional to the square function of the propagated frequencies. The inventor has found that, in one embodiment, to achieve a generally symmetrical frequency response, the radiated power from both the inner resonator tube 104 and the outer resonator tube 102 should be approximately equal. Accordingly, the dimensions of each of the resonator tubes may be selected as desired to achieve a symmetrical frequency response. Generally, by adjusting or changing the length of the overlap, or conversely, the length of the offset, the coupling coefficient between the two resonators may be adjusted. Consequently, the bandwidth or frequency range of the underwater sound source 100 may be selected for the desired application. As will be described with reference to FIG. 4, the offset between the resonator tubes may be changed using an electronic actuator system.

The acoustic driver 114 may include any suitable acoustic sound source including a spherical monopole driver. In certain embodiments, the acoustic driver 114 may include any suitable monopole drivers including capped-off ring transducers, piston devices separating two parallel plates. Generally, the driver may include sufficient piezoelectric material to provide adequate sound pressure level to excite the fluid column and the resonator assembly. The acoustic driver 114 may include any suitable driver having an electro-acoustic conversion efficiency greater than 30%. In certain embodiments, the acoustic driver 114 may have an electro-acoustic conversion efficiency greater than 50%.

Figure 2B:
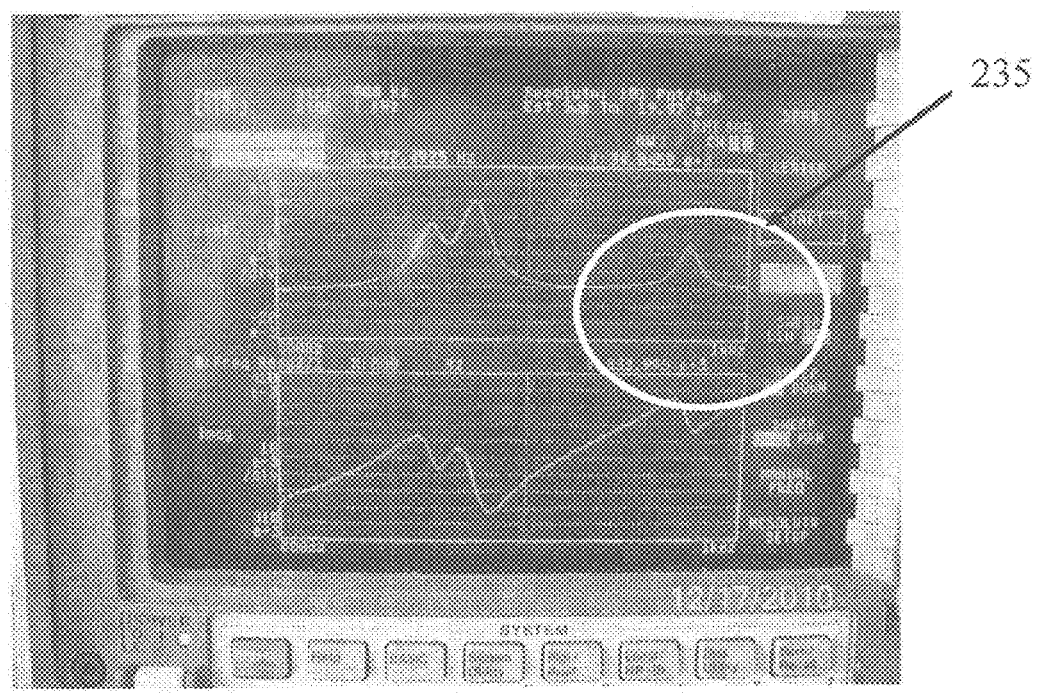

FIGS. 2A and 2B depict experimental frequency response data for an underwater sound source similar to sound source 100 of FIGS. 1A-1D. The underwater sound source used in the experiment included an inner resonator tube formed from carbon fiber having a wall thickness of about 5.3 mm, length of about 470 mm, internal diameter of about 203 mm. The underwater sound source included an outer resonator tube formed from aluminum 6061 T6, having a wall thickness of about 6 mm, length of about 419 mm, and internal diameter of about 203 mm. FIGS. 2A and 2B shows the real and imaginary parts of admittance (conductivity=inverse to impedance). The depicted analyzer in FIGS. 2A and 2B was calibrated such that level $Y=16e^{-3}$ is equal to $3e^{-5}$ [1]/ohm]. The real part of conductivity is proportional to the radiated power (units W), which can be calculated as $$W = U^2 * Y * 3e^{-5}/16e^{-3}$$

where U is the voltage on the transducer.

For example for the value selected (see diamond shaped mark 225 on the data curve) and shown on the top screen is $Y=52e^{-3}$ and the U=1000 V (it is normal voltage for such transducer) W=97 Watts. It is more than 190 dB SPL. In certain embodiments, the maximum voltage may be 1500 V, and thus the maximum power may be greater than 200 Watts. FIGS. 2A and 2B also show in both sets of data that the real portion of the measured frequency response of the sound source includes two peaks in the vicinity of 200 Hz-400 Hz. Moreover, the image data in the bottom figure illustrates a third peak that occurs after 850 Hz (see mark 235). Generally, the frequency response characteristics shown in FIGS. 2A and 2B illustrate that the underwater sound source can generate acoustic signals in a broad band of frequencies ranging from 200 Hz to about 1000 Hz.

Figure 4:
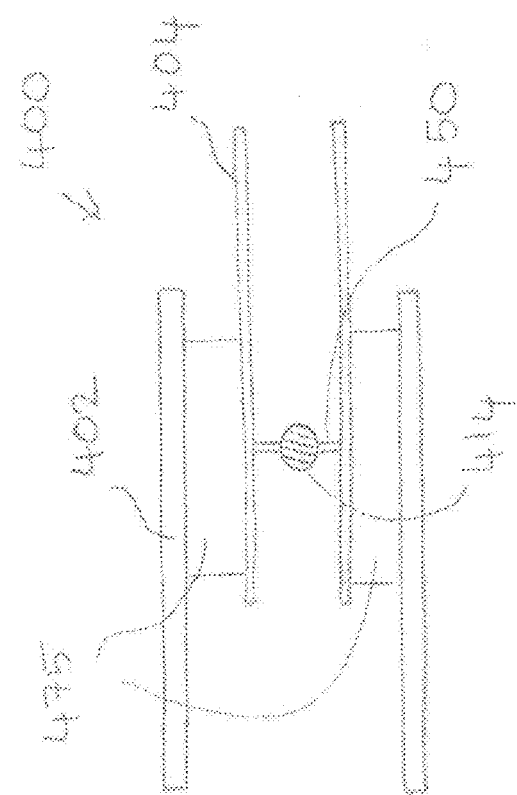
FIG. 4 depicts a side view of the structure of a broadband underwater sound source having one or more sliding actuators, according an illustrative embodiment.
Figure 3:
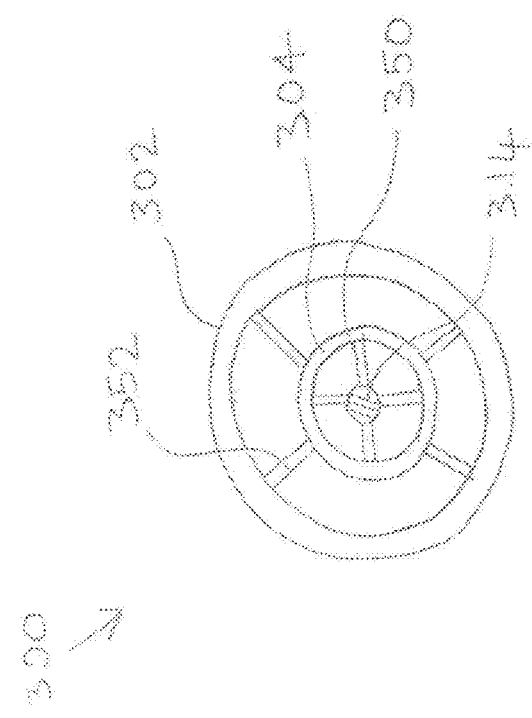
FIG. 3 depicts an end view of the structure of a broadband underwater sound source having one or more support structures, according an illustrative embodiment.

Turning now to FIGS. 3 and 4, certain structural features are described in more detail. FIG. 3 depicts an end view of the structure of a broadband underwater sound source having one or more support structures, according an illustrative embodiment. In particular, sound source 300 is shown with an outer resonator tube 302, an inner resonator tube 304 and an acoustic driver 314. The acoustic driver 314 is shown as being suspended within the inner resonator tube 304 by supports 350. One or more such supports 350 may be attached, e.g., bolted, to the inside surface of the sidewall of the inner resonator tube 304. The supports 350 may also be secured to the acoustic driver 314, thereby allowing the acoustic driver 314 to suspend within the interior of the inner resonator tube 304. Support structures, e.g., supports 352, may also be used to couple the inner resonator tube 304 to the outer resonator tube 302.

Generally, the support structures may be selected to serve as good acoustical insulators and/or good vibration/shock dampers. In certain embodiments, for long term applications, the support structures may include standard shock-mounts formed from stainless steel or aluminum 6061. Support structures may also include a combination of rubber and fiberglass, for example, a piece of rubber jammed by a fiberglass bolt.

The acoustic driver 314 may be positioned centrally within inner resonator tube 304 such that the acoustic driver 314 is both centrally located along both the diameter or width of the resonator, and across the length of the portion where the inner and outer resonator tubes overlap. However, the acoustic driver 314 may be located in other positions without departing from the scope of the present disclosure.

Figure 5:
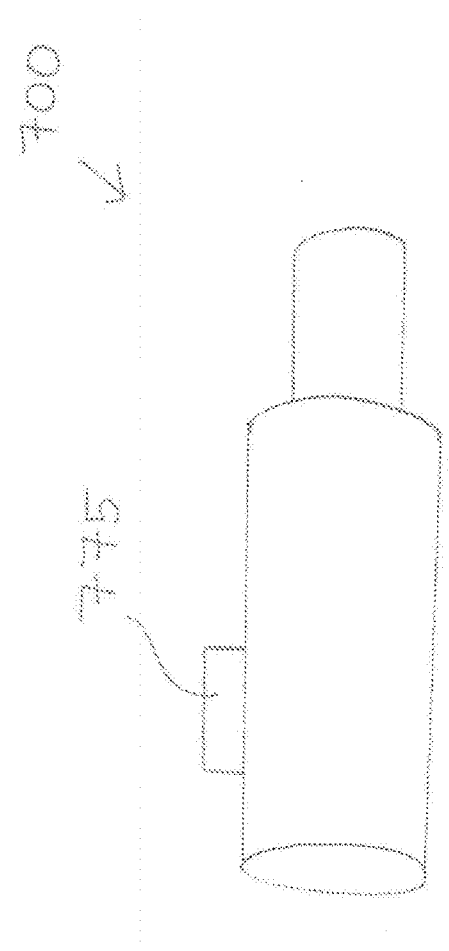
FIG. 5 depicts a side view of the structure of a broadband underwater sound source having one or more electronic control components, according an illustrative embodiment.

FIG. 4 depicts a side view of the structure of a broadband underwater sound source having one or more sliding actuators, according an illustrative embodiment. Sound source 400 shown in FIG. 4 includes an inner resonator tube 404, and outer resonator tube 402 and an acoustic driver 414 disposed within the inner resonator tube 404. Sound source 400 further includes an actuator assembly 475 for controllably shifting the inner resonator tube 404 relative to the outer resonator tube 402. The actuator assembly 475 may be configured to move the inner resonator tube 404, the outer resonator tube 402 or both. In certain embodiments, the actuator assembly 475 may be electronically activated and controlled, for example, by the electronic control unit depicted in FIG. 5. Advantageously, by moving one or more resonator tubes and adjusting the overlapping length or offset, the frequency range of the sound source 400 may be adjusted and tuned FIG. 5 depicts a side view of the structure of a broadband underwater sound source 700 having one or more electronic control components 775, according an illustrative embodiment. The electronic component 775 may be attached to the sound source 700 or may not be attached but still connected to the sound source 700. The electronic component 775 may be in communication with the acoustic driver within the sound source 700 and thereby configured to activate and control the operation of the acoustic driver. The electronic component 775 may also be in communication with any electronic actuator device for controllably sliding the resonator tubes.

In the above-described embodiments, the underwater sound sources 100, 300, 400 and 700 include two tubular resonators, each having a particular resonant frequency and each being movable relative to each other so that an overall bandwidth may be selected. In alternate embodiments an additional tubular housing, or several additional tubular housings, may also be provided such that the monopole acoustic source is surrounding three or more tubular housings, each of which may be slid relative to each other such that the coupling coefficient between the respective tubular housings may be adjusted to achieve different bandwidths for the sound source. FIGS. 6A and 6B depict side views of such broadband underwater sound sources 500 and 600 having a plurality of resonator tubes, according an illustrative embodiment. In FIG. 6A, the sound source 500 includes an additional outer resonator tube 520 such that the acoustic driver 514, inner resonator tube 504 and outer resonator tube 502 are all at least partially disposed within the additional outer resonator tube 520. FIG. 6B depicts a different arrangement whereby inner resonator tube 604 is completely disposed within the additional outer resonator tube 620 and outer resonator tube 602 is at least partially disposed within the additional outer resonator tube 620. The depicted resonator tubes may be arranged in any suitable arrangement without departing from the scope of the present disclosure. Moreover, sound sources 500 and 600 may include any number of additional tubes without departing from the scope of the present disclosure.

The systems described herein may include additional mechanical, electronic, electrical and acoustic hardware and software elements for generating sound in an underwater environment across a broad band of frequencies without departing from the scope of the present disclosure. The systems and methods described herein may be used for generating sound for any suitable application including in devices for generating warning signals, acoustic modems, acoustic transmitters, underwater mapping devices, navigation devices, and acoustic telemetry devices.

Those skilled in the art will know or be able to ascertain using no more than routine experimentation, many equivalents to the embodiments and practices described herein. Variations, modifications, and other implementations of what is described may be employed without departing from the spirit and scope of the present disclosure. More specifically, any of the method, system and device features described above or incorporated by reference may be combined with any other suitable method, system or device features disclosed herein or incorporated by reference, and is within the scope of the present disclosure. The systems and methods may be embodied in other specific forms without departing from the spirit or essential characteristics thereof. The foregoing embodiments are therefore to be considered in all respects illustrative, rather than limiting of the present disclosure. The teachings of all references cited herein are hereby incorporated by reference in their entirety.

The invention claimed is:

1. An underwater sound source, comprising
a resonator assembly, including
an outer resonator tube having a first open end, a second open end, and a sidewall with a first thickness extending therebetween, and
an inner resonator tube, at least partially disposed within the outer resonator tube, having a first open end, a second open end, a sidewall with a second thickness extending therebetween, wherein the inner resonator tube is offset from the outer resonator tube along a longitudinal axis, such that the first end of the inner resonator tube is disposed within the outer resonator tube and the second end of the inner resonator tube is disposed outside of the outer resonator tube, and wherein the second thickness is less than the first thickness; and an acoustic driver, disposed within the inner resonator tube and the outer resonator tube.

2. The underwater sound source of claim 1, wherein at least one of the inner resonator tube and the outer resonator tube is formed from carbon fiber.

3. The underwater sound source of claim 1, wherein the inner resonator tube is formed from carbon fiber and the outer resonator tube is formed from aluminum.

4. The underwater sound source of claim 1, wherein the first thickness is from about 5 mm to about 6 mm and the second thickness is from about 6 mm to about 7 mm.

5. The underwater sound source of claim 1, wherein the underwater sound source resonates at a frequency within the range of about 200 Hz to about 1000 Hz.

6. The underwater sound source of claim 1, wherein a length between the first end and the second end of the outer resonator tube along the longitudinal axis is less than a length between the first end and the second end of the inner resonator tube along the longitudinal axis.

7. The underwater sound source of claim 1, wherein a length of the inner resonator tube is about 450 mm to about 500 mm, and a length of the outer resonator tube is from about 400 mm to about 450 mm.

8. The underwater sound source of claim 1, wherein the inner resonator tube is adjustably fitted to the outer resonator tube such that outer resonator tube is moveable along the longitudinal axis with respect to the inner resonator tube, thereby allowing an adjustable resonant frequency range for the underwater sound source.

9. The underwater sound source of claim 1, wherein the acoustic driver includes a spherical monopole.

10. The underwater sound source of claim 1, wherein the outer resonator tube and the inner resonator tube are cylindrically shaped.

11. The underwater sound source of claim 1, wherein the resonator assembly further comprises one or more additional outer resonator tubes, such that the acoustic driver, inner resonator tube and the outer resonator tube are at least partially disposed within the one or more additional outer resonator tubes.

12. The underwater sound source of claim 1, wherein the acoustic driver is suspended within the inner resonator tube using one or more support structures coupling the acoustic driver to the wall of the inner resonator tube.

13. The underwater sound source of claim 1, wherein the acoustic driver is disposed at a position substantially equidistant from the first end of the inner resonator tube and the second end of the outer resonator tube.

14. A method for generating an acoustic signal underwater, comprising deploying a broad band sound source configured underwater, the sound source having a resonator assembly configured to receive fluid therein, including an outer resonator tube having a first open end and a second open end, and an inner resonator tube, at least partially disposed within the outer resonator tube, having a first open end and a second open end, wherein the inner resonator tube is offset from the outer resonator tube along a longitudinal axis, such that the first open end of the inner resonator tube is disposed within the outer resonator tube and the second open end of the inner resonator tube is disposed outside of the outer resonator tube; and an acoustic driver, disposed within the inner resonator tube and the outer resonator tube; and applying an electrical signal to the acoustic driver, thereby causing the acoustic driver to vibrate;

wherein the vibrating acoustic driver excites the fluid and causes the resonator assembly to vibrate and thereby resonate at frequencies across a range of 200 Hz to 1000 Hz.

15. The method of claim 14, wherein at least one of the inner resonator tube and the outer resonator tube is formed from carbon fiber.

16. The method of claim 14, wherein the inner resonator tube is adjustably fitted to the outer resonator tube, and the method further comprising moving the outer resonator tube along the longitudinal axis with respect to the inner resonator tube, thereby adjusting a resonant frequency range for the sound source.

* * * * *